United States Patent

Kudrus

[11] Patent Number: 6,161,789
[45] Date of Patent: Dec. 19, 2000

[54] AUTOMATIC WINDER USING ONE SETTER FOR EACH MANDREL, WHERE THE SETTERS ALTERNATE BETWEEN CONTROLLING THE MANDREL DRIVE AND THE CONTACT ROLL DRIVE

[75] Inventor: Heiner Kudrus, Barmstedt, Germany

[73] Assignee: Neumag - Neumuenstersche Maschinen - und Anlagenbau GmbH, Neumuenster, Germany

[21] Appl. No.: 09/230,620

[22] PCT Filed: Aug. 6, 1997

[86] PCT No.: PCT/EP97/04283

§ 371 Date: Jan. 28, 1999

§ 102(e) Date: Jan. 28, 1999

[87] PCT Pub. No.: WO98/08768

PCT Pub. Date: Mar. 5, 1998

[30] Foreign Application Priority Data

Aug. 29, 1996 [DE] Germany .................. 196 34 926

[51] Int. Cl.[7] .................................................. B65H 67/048
[52] U.S. Cl. .................... 242/474.6; 242/486; 242/486.3
[58] Field of Search ................. 242/486, 486.3, 242/474.5, 474.6

[56] References Cited

U.S. PATENT DOCUMENTS

| | | |
|---|---|---|
| 4,084,760 | 4/1978 | Nakano et al. .............. 242/474.6 |
| 4,765,552 | 8/1988 | Sugioka et al. . |
| 4,917,319 | 4/1990 | Lenk .................... 242/474.5 |
| 5,082,191 | 1/1992 | Wirz . |
| 5,462,239 | 10/1995 | Kle et al. ................. 242/486 |
| 5,605,293 | 2/1997 | Imae et al. . |
| 5,924,645 | 7/1999 | Oshiumi ................ 242/486 |

FOREIGN PATENT DOCUMENTS

| | | |
|---|---|---|
| 0 254 944 | 10/1990 | European Pat. Off. . |
| 0 391 101 B1 | 5/1994 | European Pat. Off. . |

*Primary Examiner*—Donald P. Walsh
*Assistant Examiner*—Collin A. Webb
*Attorney, Agent, or Firm*—Michael J. Striker

[57] ABSTRACT

In reversible head winders two bobbin holders (3a, 3b) are alternately used. Each bobbin holder is coupled to a frequency-controllable drive (9a, 9b) associated to a frequency converter (14a, 14b). A sensing roller (6) which in operation is in contact with the surface of the bobbin (5) being formed is also equipped with a drive (10). According to the invention, each frequency converter (14a, 14b) can be switched from the drive (9a, 9b) of the associated bobbin holder (3a, 3b) to the drive (10) of the sensing roller (6). The drive of the sensing roller (6) is electrically connected to the frequency converter (14b) of the bobbin holder (3b) which is momentarily in the ready position. In this manner one can spare a frequency converter for the drive (10) of the sensing roller (6).

3 Claims, 2 Drawing Sheets

AUTOMATIC WINDER USING ONE SETTER FOR EACH MANDREL, WHERE THE SETTERS ALTERNATE BETWEEN CONTROLLING THE MANDREL DRIVE AND THE CONTACT ROLL DRIVE

BACKGROUND OF THE INVENTION

The invention relates to a device.

It is based on a device described in European Patent Disclosure EP 0 254 944 B1. In this known device, the drive mechanism of the feeler roller and the drive mechanisms of each of the two creels each need their own resetter. Each of the two resetters assigned to the creels can be switched over by a switch to the drive mechanism the feeler roller. When the machine is started up, the drive mechanism of the feeler roller is first supplied by the resetter that belongs to the creel in readiness at that time. Once the rotation of the feeler roller has stabilized, the drive mechanism is switched over to its own resetter. This connection continues until the machine is stopped.

A device for winding up yarns is also known from European Patent Disclosure EP 0 391 101 B1, in which a separate resetter is provided for the drive mechanism of the feeler roller and for each of the drive mechanisms of the two creels.

SUMMARY OF THE INVENTION

The object of the invention is to make an uninterrupted yarn winding device having less expensive than in the prior art.

In keeping with these objects, a device for uninterrupted yarn winding in accordance with the present invention has a drive mechanism of a filler roller which is electrically connected except for a brief period of time when the bobbin change takes place- with a resetter of a creel that is in the readiness position at that time.

By means of these characteristics, a separate resetter for the feeler roller is dispensed with. Only two resetters are provided for the total of three drive mechanisms of the two creels and the feeler roller.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
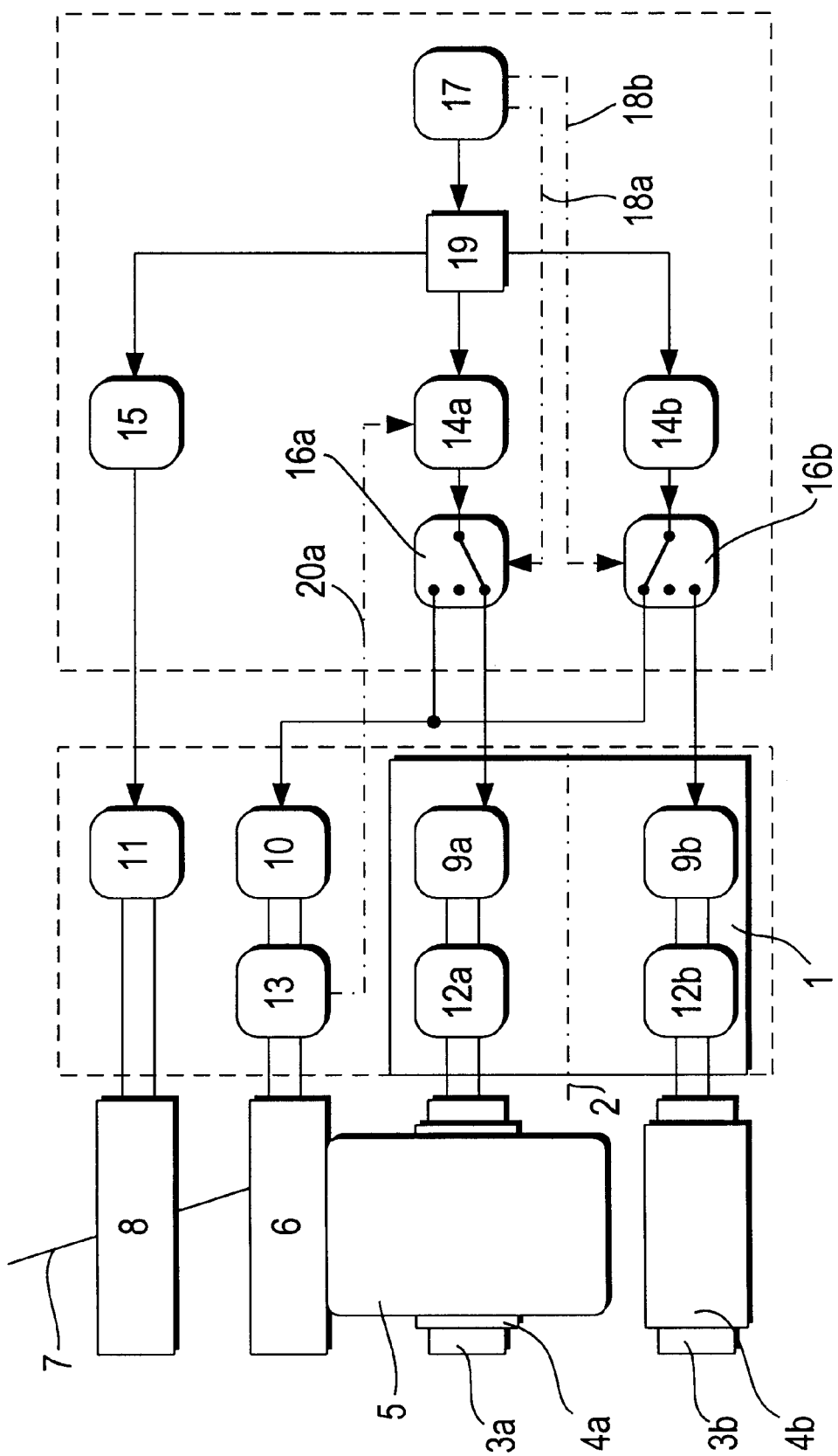
FIGS. 1 and 2 show a device according to the invention in two different operating states.

Two creels 3a, 3b are mounted on an inverter head 1 which is pivotable about an axis 2. In the state shown in FIG. 1, the creel 3a is in the winding position and the creel 3b is in the readiness position. A bobbin tube 4a is seated on the creel 3a. A bobbin 5 is wound onto it and is shown being formed. An empty tube 4b rests on the creel 3b.

The jacket face of a feeler roller 6 rests on the surface of the bobbin 5. A yarn 7 is delivered to the bobbin via a shogging device 8 in a known manner, in the process wrapping around the feeler roller 6 over part of its circumference.

The two creels 3a, 3b, the feeler roller 6, and the shogging device 8 each have their own controllable-frequency drive mechanism 9a, 9b, 10, 11. Sensors 12a, 12b, 13 are provided for measuring the rpm of the two creels 3a, 3b and of the feeler roller 6.

Each of the drive mechanisms 9a, 9b of the two creels 3a, 3b is assigned its own resetter 14a, 14b with a variable starting frequency, and the drive mechanism 11 of the shogging device 8 is assigned a resetter 15. No separate resetter is provided for the drive mechanism 10 of the feeler roller 6.

In the operating state shown in FIG. 1, the drive mechanism 9a of the creel 3a that is in the winding position is connected electrically to the resetter 14a via a switch 16a, which is electrically actuated by a control unit 17 via a line 18a. The resetter 14a is designated as the "assigned" resetter for the drive mechanism 9a with which it is connected whenever the associated creel 3a is in the winding position. The same is correspondingly true for the resetter 14b with respect to the drive mechanism 9b and the creel 3b. A bus system 19 is provided for transmitting the signals of the control unit 17.

The creel 3b in the readiness position is not driven. The associated resetter 14b is electrically connected to the drive mechanism 10 of the feeler roller 6 via a switch 16b, which is to be actuated by the control unit 17 via a line 18b. This resetter operates at a constant starting frequency, which is equivalent to the desired rpm of the feeler roller 6.

A signal corresponding to the actual rpm of the feeler roller 6 is delivered by the sensor 13, over a line 20a, to a governor, not shown in the drawing, that is integrated with the resetter 14a. The actual rpm of the of the feeler roller 6 is proportional to the surface speed of the bobbin 5. The governor of the resetter 14a compares the actual value for the surface speed with the associated desired value, which is specified to the governor by the control unit 17 as a guide variable, and it varies the starting frequency of the resetter 14a, and thus also the rpm of the drive mechanism 9a, in such a way that the surface speed of the bobbin 5 is kept constant.

After a predetermined length of time or after a predetermined bobbin diameter is reached, the bobbin change initiated, either manually or preferably automatically. The resetter 14b is disconnected from the drive mechanism 10 of the feeler roller 6 by the switch 16b. The feeler roller 6 is kept at a substantially constant rpm by the bobbin 5, which continues to press slightly against its surface.

The resetter 14b, after its starting frequency is reset to zero, is electrically connected to the drive mechanism 9b of the creel 3b that is still in the readiness position. Under the control of the control unit 17, the starting frequency of the resetter 14b is increased. This brings the creel 3c to the starting rpm, at which the surface speed of the empty tube 4b seated on it precisely matches the speed of the arriving yarn 7.

Figure 2:
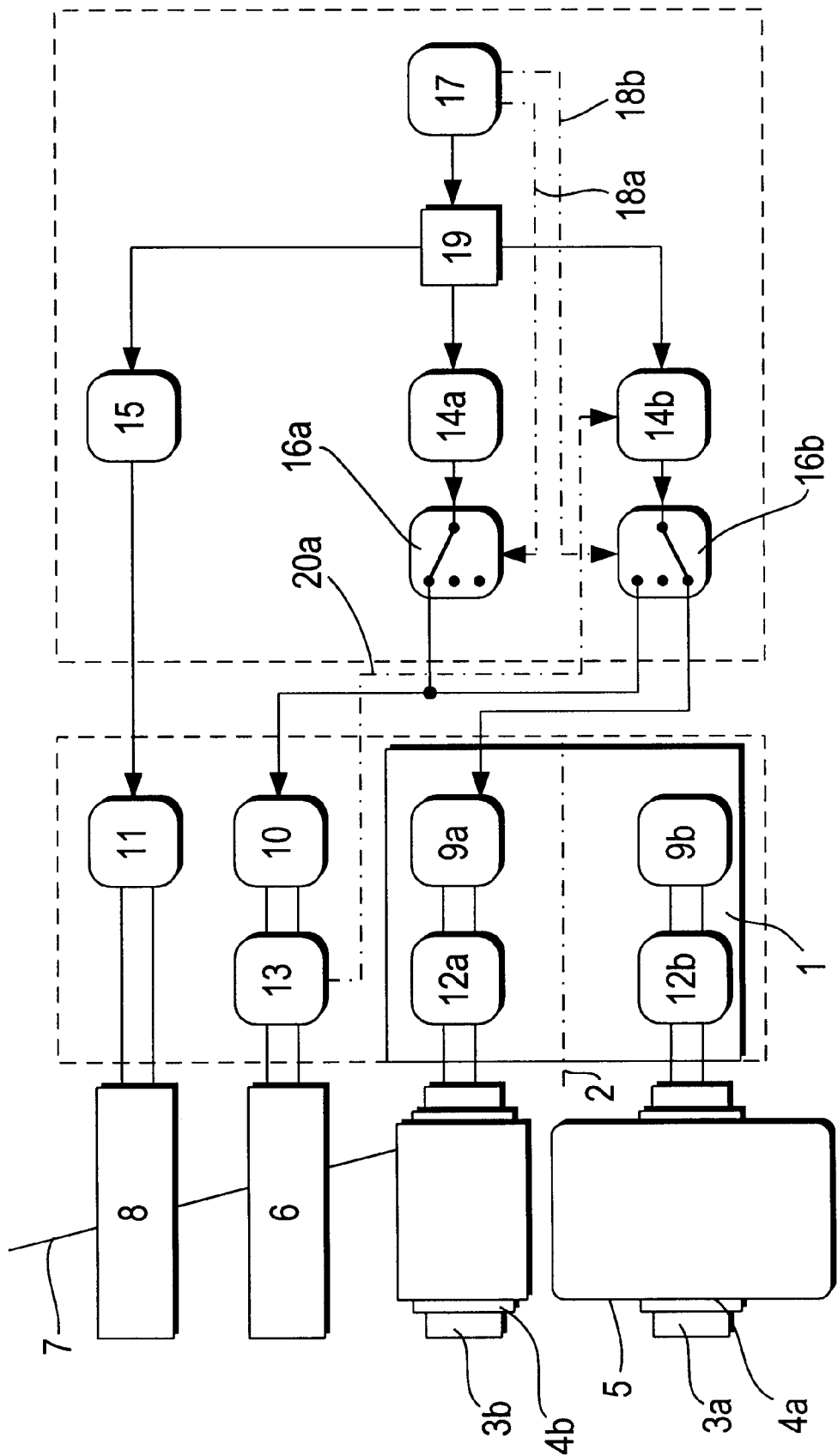

The inverter head 1 is now rotated about its axis 2 far enough that the yarn is transferred, in a known manner, from the full bobbin 5 to the empty tube 4b seated on the bobbin 3b (FIG. 2). The line 20a is disconnected. Once the new bobbin, which begins to form on the tube 4b, has come into contact with the feeler roller 6, a line 20b is connected between the sensor 13 and a governor integrated with the resetter 14b. The creel 3a with the full bobbin 5 is braked with the resetter 14a. The resetter 14a is disconnected from the drive mechanism 9a and set to a starting frequency that matches the actual value of the rpm of the feeler roller 6. The control unit 17, by actuating the switch 16a, makes the electrical contact between the resetter 14a and the drive mechanism 10 of the feeler roller 6.

This cycle is repeated constantly; the drive mechanism 10 of the control unit 6 is supplied in alternation, in each case essentially for the duration of one bobbin travel, by one of the two resetters 14a, 14b. Only during a brief period of time when the bobbin change is made is the electrical supply to the drive mechanism 10 interrupted. This interruption has no deleterious influence on bobbin formation.

What is claimed is:

1. A device for uninterrupted yarn winding, comprising two creels switchable between a winding position and a readiness position and including a first creel with a first control-frequency drive mechanism and a first resetter of variable starting frequency electrically connected with said first drive mechanism when said first creel is in the winding position, and a second creel having a second control-frequency drive mechanism and a second resetter of variable starting frequency electrically connected to said second drive mechanism when said second creel is in the winding position; a filler roller having a jacket face which contacts a surface of a bobbin that is being formed and is provided with a drive mechanism; and a switch operative for electrically connecting said drive mechanism of said filler roller with said first resetter when said first creel is in the readiness position, and electrically connecting said drive mechanism of said filler roller with said second resetter when said second creel is in the readiness position, said drive mechanism of said filler roller being electrically connected with a respective one of said resetters in the readiness position, except for a brief period of time when a bobbin change takes place.

2. A device as defined in claim 1; and further comprising a programmed control unit operative for switching said resetter connected to said drive mechanism of said filler roller over to said drive mechanism of a respective one of said creels shortly before said creel is switched into said winding position, and switching another one of said resetters to said drive mechanism of said filler roller once the respective creel has been switched to said readiness position.

3. A device as defined in claim 1; and further comprising a programmed control unit operative for disconnecting said resetter from said drive mechanism of said filler roller, resetting the starting frequency of said resetter to zero, connecting said resetter to said drive mechanism of a respective one of said creels, running the starting frequency of said resetter up to a starting rpm of a new bobbin, transferring the yarn from a full bobbin to an empty tube by rotation of an inverter head, braking another one of said creels by reducing an rpm of another one of said resetters, disconnecting said other resetter from said drive mechanism of said other respective creel, resetting the starting frequency of said other resetter to an rpm of said filler roller, and connecting said other resetter to said drive mechanism of said filler roller.

* * * * *